United States Patent [19]
Schoon

[11] Patent Number: 5,684,620
[45] Date of Patent: Nov. 4, 1997

[54] HIGH RESOLUTION IMAGING SYSTEM AND METHOD OF IMAGING USING THE SAME

[75] Inventor: David J. Schoon, Mendota Heights, Minn.

[73] Assignee: Schoonscan, Inc., Mendota Heights, Minn.

[21] Appl. No.: 594,017

[22] Filed: Jan. 30, 1996

[51] Int. Cl.⁶ ............................................. G02B 26/08
[52] U.S. Cl. ..................... 359/298; 347/240; 347/241; 355/1
[58] Field of Search ........................ 359/298; 347/240, 347/241, 236, 130; 355/1, 70

[56] References Cited

U.S. PATENT DOCUMENTS

| | | | |
|---|---|---|---|
| 1,193,999 | 8/1916 | Dixon | 359/298 |
| 3,618,736 | 11/1971 | Abell, Jr. | 197/17 |
| 3,698,006 | 10/1972 | Ovshinsky | 46/74 ES |
| 3,934,698 | 1/1976 | McGourty | 197/90 |
| 4,122,496 | 10/1978 | Childress et al. | 358/298 |
| 4,312,004 | 1/1982 | Samek et al. | 346/1.1 |
| 4,389,655 | 6/1983 | Baues | 347/241 |
| 4,435,064 | 3/1984 | Tsukada et al. | 355/1 |
| 4,542,392 | 9/1985 | Schulz-Hennig | |
| 4,571,623 | 2/1986 | Schoon | 358/208 |
| 4,586,057 | 4/1986 | Schoon | |
| 4,630,223 | 12/1986 | Schoon | 364/518 |
| 4,686,363 | 8/1987 | Schoon | 250/235 |
| 4,739,416 | 4/1988 | Manian | 358/302 |
| 4,746,942 | 5/1988 | Moulin | 354/5 |
| 4,761,057 | 8/1988 | Zak et al. | 350/273 |
| 4,800,396 | 1/1989 | Hertz | |
| 4,808,832 | 2/1989 | Doggett | 250/548 |
| 4,867,543 | 9/1989 | Bennion et al. | 350/384 |
| 4,897,672 | 1/1990 | Horiuchi et al. | 347/236 |
| 4,899,223 | 2/1990 | Springer et al. | 358/302 |
| 4,951,064 | 8/1990 | Kun et al. | |
| 4,967,240 | 10/1990 | Kitano et al. | 355/318 |
| 4,999,558 | 3/1991 | Onodera et al. | 318/685 |
| 5,040,003 | 8/1991 | Willis | |
| 5,054,893 | 10/1991 | Schoon | 359/254 |
| 5,164,742 | 11/1992 | Baek et al. | |
| 5,168,288 | 12/1992 | Baek et al. | 347/240 |
| 5,225,851 | 7/1993 | Schoon | 347/240 |
| 5,274,397 | 12/1993 | Grover | 346/1.1 |
| 5,434,600 | 7/1995 | Schoon | 347/243 |

FOREIGN PATENT DOCUMENTS

| | | |
|---|---|---|
| 0 112 518 A3 | 7/1984 | European Pat. Off. |
| 0 189 664 A3 | 8/1986 | European Pat. Off. |
| 0 192 486 A3 | 8/1986 | European Pat. Off. |
| 0 264 341 A2 | 4/1988 | European Pat. Off. |
| 0 506 410 A2 | 9/1992 | European Pat. Off. |
| 0 529 532 A2 | 3/1993 | European Pat. Off. |
| 1 128 199 | 4/1962 | Germany |
| 36 43 214 A1 | 6/1988 | Germany |
| WO 95/18423 | 7/1995 | WIPO |
| WO 95/19606 | 7/1995 | WIPO |

*Primary Examiner*—Loha Ben
*Attorney, Agent, or Firm*—Merchant, Gould, Smith, Edell, Welter & Schmidt, P.A.

[57] ABSTRACT

An imaging apparatus modulates or gates pluralities of light beams through individual light valves, thereby providing a greater number and finer resolution of modulated light beams without increasing the number of light valves or decreasing the spacing between adjacent light valves. A two-step modulation process is used, the first step being performed by a light generator incorporating a polygon mirror that selectively illuminates selected bundles of fiber optic strands. One strand from each bundle is routed to illuminate one of the cells in a light valve array, such that when a bundle is illuminated, every cell is illuminated by a strand from the illuminated bundle. The second step of the modulation process involves controlling the light valve array to modulate the light beams formed by the illuminated strands at each cell. Further, by ganging together multiple light valve arrays, a composite scan line may be created which spans across the width of several scan lines generated by the individual light valve arrays. The result is finer resolution and greater imaging speed utilizing far fewer light valves.

24 Claims, 9 Drawing Sheets

HIGH RESOLUTION IMAGING SYSTEM AND METHOD OF IMAGING USING THE SAME

FIELD OF THE INVENTION

The invention is directed to imaging systems and methods of imaging photosensitive media and the like. More particularly, the invention is directed to imaging systems and methods of imaging wherein multiple pixels are imaged simultaneously.

BACKGROUND OF THE INVENTION

Imaging systems are used to create hard copy visually observable presentations of electronic information. Examples include xerographic printers, ink jet printers, laser, LED and CRT imagers (including black and white or color, and imaging onto silver halide media), dye sublimation and wax transfer imagers, among others. With each type of system there is generally a computer file which contains representations of photographic images, artwork, graphics and/or text, and there is a desire to obtain a paper or film hard copy from that data.

Electronic production and manipulation of images and text is highly efficient. Increasingly over time photographs exist as computer files rather than or in addition to existing as hardcopies or pieces of film. The digital environment permits easy retouching and editing, addition of text and imposition of various photos into a layout. Moreover, for color photographs, digital color lookup tables can compensate for deficiencies in the photographic media and in the exposure conditions. The existence of images in digital form therefore creates a need for high quality imaging systems to create hard copies of these digital images.

Some imaging technologies require the use of light for the creation of a latent image on a xerographic drum or silver halide media. One common way of doing this is to deflect a laser beam with a rotating polygon mirror. For exposure of color silver halide media, for example, three lasers are used, one each of (typically) red, green, and blue. For xerographic applications a single laser is typically used. The deflected beam is projected either onto a xerographic drum or onto silver halide media as appropriate, with the laser beam being modulated imagewise.

Another common way of creating an image is to utilize a high-resolution CRT. With a CRT, the black and white phosphor image is filtered successively with red, green, and blue filters and imaged onto silver halide film or paper in order to create an image.

Still another way of creating an image is to utilize a light valve array to modulate a plurality, e.g., 64 beams of light emanating from a white light source (e.g., a short arc xenon lamp) which has been filtered. Photographic media is wrapped around a drum and the image is created in bands, e.g., of 64 pixels wide.

A commonly sought objective is to increase the speed of imaging while simultaneously increasing the resolution and the size of the resultant image. However, speed, resolution and image size all tend, with conventional technologies, to be competing objectives that must be balanced or compromised.

For example, one application for imaging technologies is in point of sale advertisements and trade show displays, many of which may need to be as large as 50"×100" or greater. It is desired that the text be sharp (e.g., often at least 8192 pixels across the 50" width), even at close viewing distances. It is desired that the image be created in less than 10 minutes. Both of these objectives, however, cannot be met or approached by conventional technologies.

Another application is the "package printer" market which requires that photos, e.g., school portraits, be imaged at various sizes and with the addition of text and other graphics. To compete with other processes the imaging speed must be about one lineal inch per second. Again, this is not currently possible with conventional technologies.

Still another application is the pre-press market, wherein films are created for later contact printing to printing plates, or wherein plates are imaged directly. In order to create high quality halftone dots the resolution must be at least 2,000 dpi, and the film width may need to be as much as 50" wide. Such a capability does not exist with conventional technologies except at very high cost. Smaller films are generally prepared on laser imagers and then reimaged with a step and repeat imager to create the larger film. However, it would be desirable if the ultimate film could instead be imaged in a single step.

It should be appreciated therefore that the objectives of large size, high resolution, and rapid speed are difficult at best to meet with existing technologies. In the case of the laser imager the demand of larger size requires a greater spacing between the polygon mirror and the media. The requirement for higher resolution requires that this same distance be reduced—an objective at odds with the first requirement. The requirement for higher speed requires that the laser be brighter and that the modulating device (e.g., an accousto-optic modulator) be faster. However, beyond a certain point this is not possible with existing technology.

In the case of a CRT imaging system, higher resolution, up to a point, is obtained by reducing the intensity of the image. Beyond that, however, true resolutions much greater than 2,000 pixels per screen are difficult to obtain. Moreover, the reduction of intensity in order to accomplish smaller spot size and thus greater resolution is at odds with the objective to image larger media, which instead requires greater light levels.

In the case of a light valve array imaging system, higher resolution might be obtained by increasing the number of cells in the light valve array and thus making each band of image wider. Theoretically, the objectives of larger size, higher resolution and faster speed can all be met, but in practice certain problems are encountered. Most notably, precisely aligning adjacent image bands is difficult, requiring some degree of overlapping between the bands. However, in the overlapping regions, even if alignments and densities are set perfectly, reciprocity failure of the media can still cause visible discontinuities between bands.

Reciprocity failure is a complex function of color and presents a considerable obstacle to system design. Reciprocity failure is experienced in silver halide media at very short exposure times. It would be desired and possibly expected that the media would respond the same, e.g., to a single burst of light as it would to two bursts of light each at half the intensity. However, with short exposure times, (e.g., under a millisecond) separated by a long time (e.g., on the order of a second) this is not the case. Moreover, for color media the phenomenon is quite complex. The amount of reciprocity failure which is seen in a given layer of a medium depends on what is happening in other layers. Potential solutions to reciprocity failure problems include adjusting exposure according to complex three dimensional lookup tables, eliminating all overlapping between pixels (including scattering within the medium), or shortening the interval between bursts of light to well under a second.

Various other methods have been attempted for accomplishing the high speed, large size, and high resolution objectives—many of which involve creating an image in bands. However, all bandwise imaging presents both a need to align sections of image precisely and a need to compensate for reciprocity failure, and to date, no technology has fully addressed both problems.

Therefore, a substantial need has arisen for an imaging system offering high speed, large size and high resolution which does not suffer from many of the drawbacks associated with conventional technologies. More specifically a need has arisen for an imaging system which is capable of imaging multiple points simultaneously while minimizing visible discontinuities in the resulting image.

SUMMARY OF THE INVENTION

The invention addresses these and other concerns associated with the prior art in providing an imaging apparatus which modulates or gates pluralities of light beams through individual light valves, thereby providing a greater number and finer resolution of modulated light beams without increasing the number of light valves or decreasing the spacing between adjacent light valves. Modulation with the preferred embodiments of the invention can also be understood to involve a two step process—that of jointly modulating entire groups of light beams and then modulating individual light beams within each group.

In some preferred embodiments, a light generator incorporating a polygon mirror selectively illuminates selected bundles of fiber optic strands to selectively illuminate only a portion of a plurality of fiber optic strands which terminate at any given light valve or cell, whereby the light generator functions as a multiplexer or supplemental modulator at the input to each light valve. Moreover, in other preferred embodiments, a composite scan line is created by ganging a plurality of light valve array modules together side by side to create a long line of image data of arbitrary size and resolution. The scan line may even extend fully across an effective imaging area of a photosensitive medium, thereby eliminating the need for imaging in separate bands or regions.

Therefore, in accordance with one aspect of the invention, an apparatus is provided for imagewise exposing photosensitive media. The apparatus includes a light valve array having a plurality of cells; a plurality of fiber optic strands having first and second ends and arranged relative to the light valve array to illuminate the light valve array through the second ends, with the second ends of at least two strands illuminating each cell in the light valve array; and a light generator selectively illuminating the first ends of the plurality of fiber optic strands.

In accordance with an additional aspect of the invention, an apparatus is provided for imagewise exposing photosensitive media. The apparatus includes light generating means for generating first, second, third and fourth light beams, the light generating means including a first modulating means for modulating the first, second, third and fourth light beams; second modulating means, having first and second inputs, for modulating light received at the first and second inputs; and conveying means for conveying the first and third light beams from the first modulating means to the first input of the second modulating means and the second and fourth modulated light beams from the first modulating means to the second input of the second modulating means.

In accordance with another aspect of the invention, there is provided a method of imagewise exposing photosensitive media. The method includes the steps of generating a plurality of light beams; jointly modulating groups of light beams from the plurality of light beams; modulating individual light beams within each group of light beams to generate a plurality of output light beams; and conveying the output light beams to a photosensitive medium to expose an image thereon.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there is described preferred embodiments of the invention.

DETAILED DESCRIPTION OF THE PREFERRED EMBODIMENTS

Figure 1:
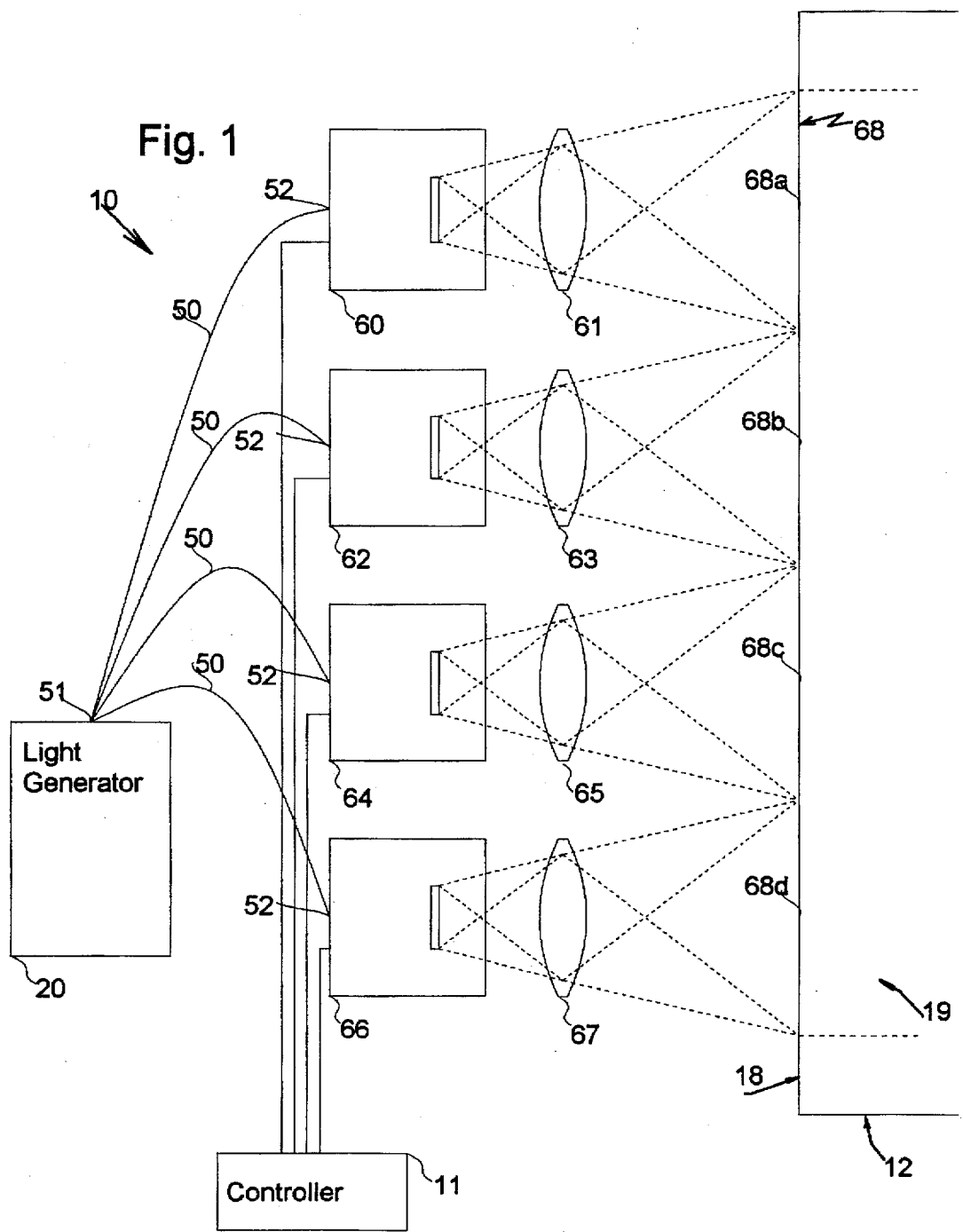
FIG. 1 is a functional block diagram of a preferred imaging apparatus consistent with the invention.

In preferred embodiments of the invention, a common light generating module, or light generator, generates a plurality of light beams which are modulated in groups and then conveyed to one or more imaging modules which then modulate the individual light beams within the groups.

The preferred light generator utilizes a light source to generate a primary light beam which is reflected off of a spinning polygon mirror to one of a plurality of bundles of fiber optic strands. As the polygon mirror rotates, each of the fiber optic bundles is sequentially illuminated.

The other end of this array of fiber optic bundles is brought to the surface of a light valve array which has a plurality of cells so that individual fiber optic strands may illuminate designated cells. Each of the bundles accessed by the polygon mirror has one strand brought out within the active region of each light valve cell, with the ends of the fibers being arranged to form a more or less linear array. A portion of the strands terminating at each light valve cell may overlap spatially with other strands in other cells, thereby reducing the effective number of strands per cell.

For example, in one preferred embodiment, 20 fiber optic bundles are provided, which are connected to a light valve array including 64 cells staggered into two rows, thereby orienting 20 strands proximate each cell. With four of the strands overlapping spatially with other strands in other cells, an effective width of 16 strands is provided in each cell, and the array of fiber optic strands may be considered to include 16 bundles. In this configuration, the first bundle would have strands directed at scan lines #1, 17, 33, etc., the second bundle would have strands directed at scan lines #2, 18, 34, etc., the third bundle would have fibers directed at scan lines #3, 19, 35, etc., and so on. Thus each cell in the light valve array would control 16 pixels in the image. Compared to the alternative of providing one light valve cell for each pixel, this is far less expensive and far more reliable.

Moreover, preferred embodiments of the invention may utilize a plurality of imaging modules, arranged in a side-side-by-side manner, to provide a longer effective scan line. This may have the benefit of imaging the entire width of a photosensitive media without resorting to imaging in multiple bands. Continuing with the above example, if four imaging modules are arranged side-by-side, a total of 4098 pixels (4 modules×64 cells/module×16 pixels/cell) may be imaged within the same scan line.

Turning now to the Drawing, wherein like numbers denote like parts throughout the several views, FIG. 1 shows a preferred imaging apparatus 10 consistent with the principles of the present invention. Apparatus 10 generally includes a light generator 20 coupled to a plurality of imaging modules 60, 62, 64 and 66 through an array of fiber optic strands 50 having first ends 51 coupled to the light generator and second ends 52 coupled to the imaging modules.

A controller 11 coordinates the activities of the light generator and the imaging modules to output a scan line 68 of image data onto a photosensitive medium. A plurality of light beams are output from imaging module 60 and are focused by an optical system (e.g., lens 61) to image a portion 68a of scan line 68 onto the photosensitive medium. Similarly, imaging modules 62, 64 and 66 output light beams which are focused by lenses 63, 65 and 67 to image portions 8b, 68c and 68d of scan line 68.

A fine adjustment in the alignment of the various modules is preferably provided so as to align the portions to form a contiguous scan line that is substantially free of any discontinuities between the scan line portions. Adjustment and alignment of the imaging modules is important. Each module therefore preferably includes means for adjusting its respective lens (e.g., lens 61 for module 60) to be closer to or farther from the photosensitive medium to obtain correct focus and magnification, in a similar manner as adjusting the focus on a camera. Each module also preferably has means for adjusting its portion of the scan line up or down (i.e., in a direction perpendicular to the axis of the scan line). This is preferably a screwdriver adjustment on the entire module which allows it to tilt slightly.

The remaining adjustment which is preferably provided for the imaging modules is that of correcting separation from module to module. Each module is preferably mounted to a track which allows it to slide closer or further away from adjoining modules. Between each of the modules is a wedge which may be moved by a screwdriver adjustment so as to push the modules further apart or closer together. At each end of the entire assembly of modules is a spring and a fixed stop, positioned so as to force the modules closer to each other, restricted only by the wedges which separate the modules.

It will be appreciated that other mechanisms may be utilized to provide any of the above-listed adjustments for the imaging modules. Moreover, certain adjustments may not be required in some applications.

The modules are preferably adjusted as follows. A test pattern is imaged which is alternating groups of two pixels fully on and two pixels fully off. In place of a silver halide medium, however, a hard copy linear ruling at the same frequency (two pixels on, two pixels off) is placed in the image plane in the region where scan line portions (e.g., portions 68a and 68b) join. The pattern is precisely aligned so that a portion of it interferes with a portion of region 68a, with pixels which are on falling on black lines and pixels which are off aligning to white lines. The result is a generally dark region, except that if the ruling is slightly misaligned the region is much brighter. This alignment being done, the alignment of the adjoining module is adjusted until the same darkness is seen in the area which it images. This method is preferably used because it produces a rather large visual indication of small misalignments, thus permitting more precise alignment.

In the preferred embodiment, the photosensitive medium is a photosensitive film 18 such as a silver halide film that is supported on the surface of a drum 12. Film 18 typically includes an imaging area 19 that represents the active photosensitive area of the film upon which it is desired to form an image. The imaging area may include the full width of the film, or there may be a border area on either or both edges of the film. Other photosensitive media, including other films as well as photosensitive drums, may also be used consistent with the invention.

Figure 2:
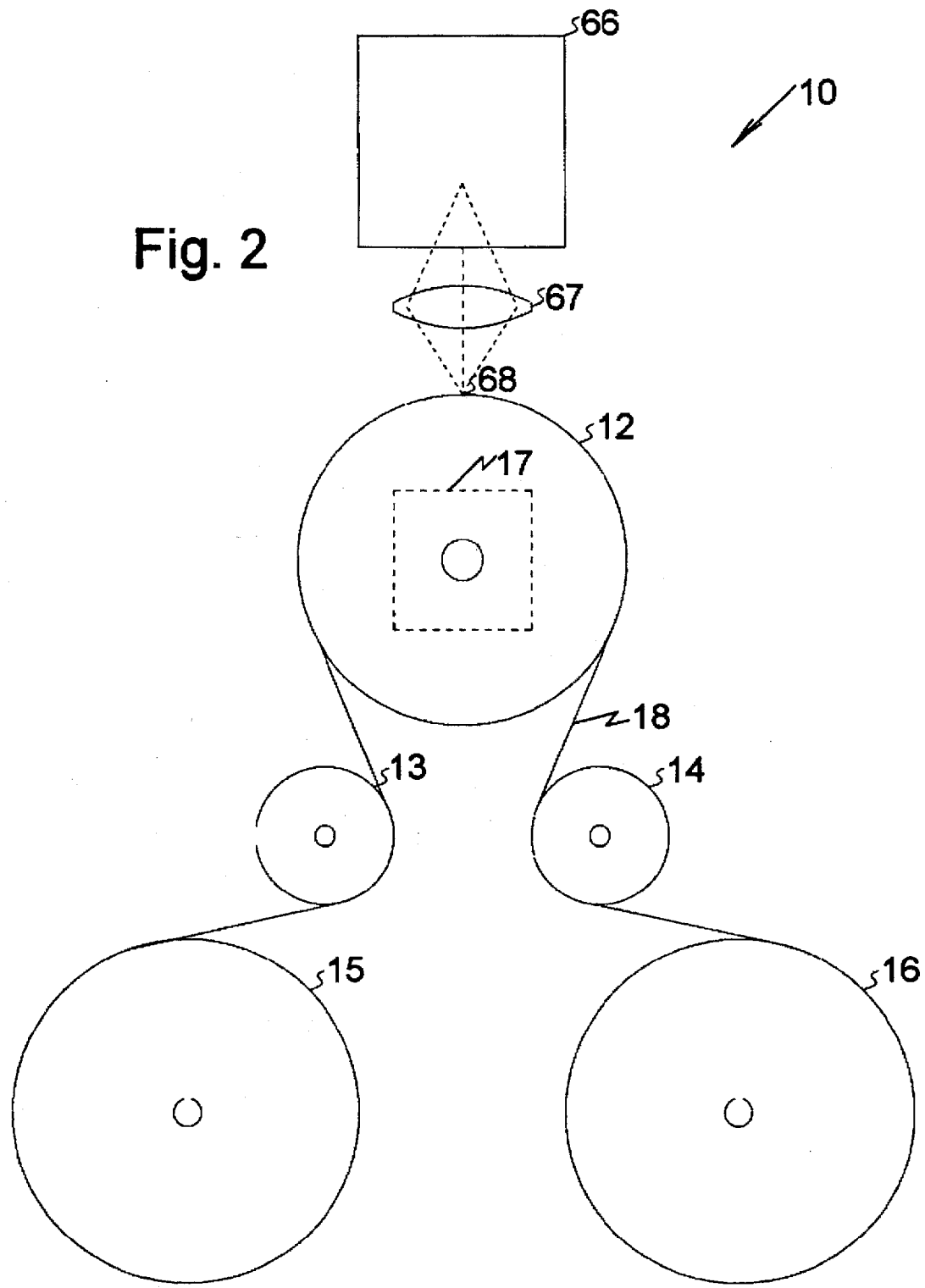
FIG. 2 is a functional side elevational view of the medium transport mechanism in the imaging apparatus shown in FIG. 1.

FIG. 2 illustrates the preferred medium transport mechanism in apparatus 10 for moving the photosensitive medium relative to scan line 68 imaged through the aforementioned optical systems (only one of which, optical system 67 for imaging module 66, is shown in FIG. 2). In the preferred embodiment, a roll-to-roll medium transport mechanism is utilized, where a photosensitive film 18 (e.g., a 12" wide roll of color silver halide film such as Kodak Supra II or Konica QA negative acting color paper) is supplied by supply roll 15 and taken up by take-up roll 16, both driven by bi-directional motors (not shown). The motors are controlled so as to maintain the tension in the media at a constant level via dancer rollers 13 and 14. The paper is wrapped around capstan or drum 12 which is turned at a constant rate by a stepping motor and worm drive (functionally illustrated at 17). After imaging, the roll of film may be removed from take-up roll 16, placed in a black bag, carried to a processor, and processed chemically to yield a color image.

Numerous other medium transport mechanisms may be incorporated consistent with the invention. For example, the medium transport may rotate only a photosensitive drum which transfers an image to paper as in a laser printer. Further, imaging may be performed on a flat bed, rather than a drum or similar support. In general, the type of transport will be dictated by the type of medium imaged and the particular handling requirements of this medium.

Figure 3:
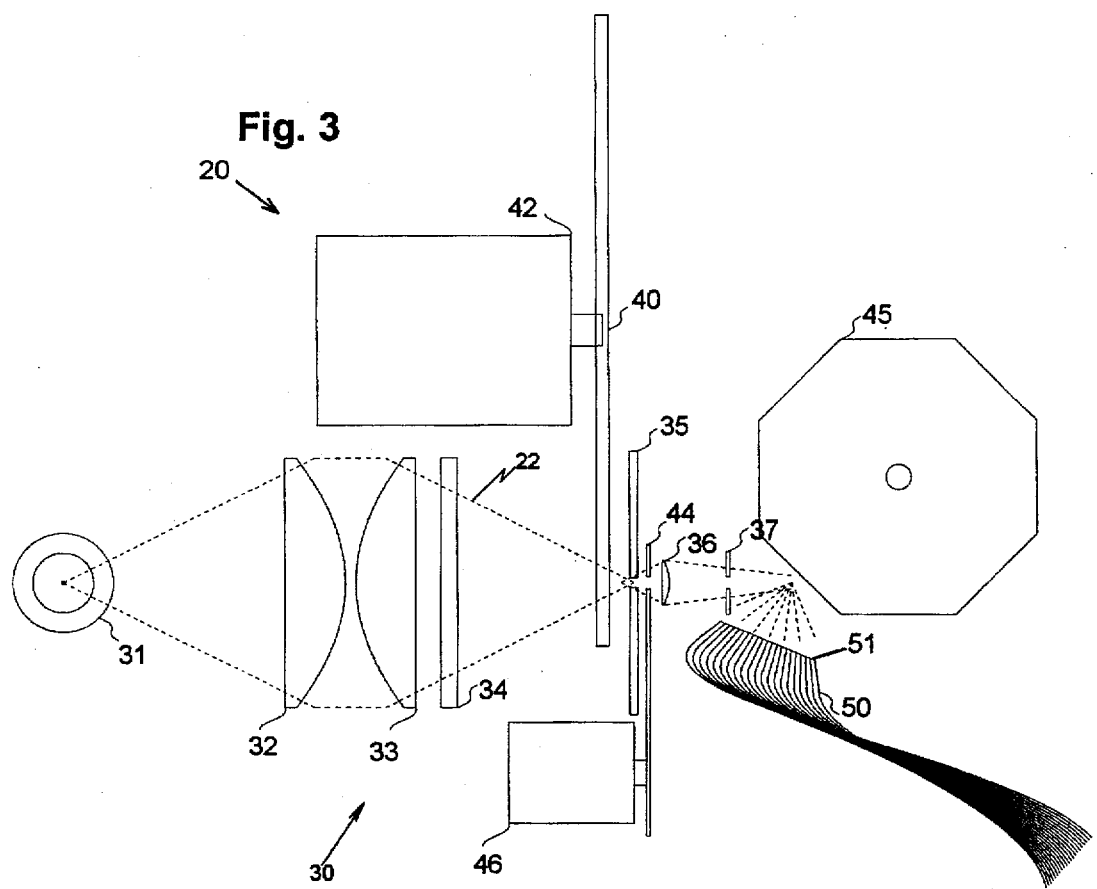
FIG. 3 is a functional top plan view of the light generating module in the imaging apparatus of FIG. 1.

Referring next to FIG. 3, light generator 20 is shown in greater detail. A primary light beam 22 is created in light generator 20 by a light source 30 which includes a 150 watt short arc xenon lamp 31, such as an Optical Radiation Corporation USA150-1 lamp. This lamp dissipates about half of the total energy within a sphere of 0.5 mm diameter, and has a color temperature which is uniform throughout its life. Alternate light sources, including another lamp, a laser, a laser diode or a light emitting diode, among others, may be used in the alternative.

The intense nearly point source of light generated by lamp 31 is imaged by a first lens assembly (including lenses 32 and 33) onto a first aperture on a first opaque member 35. Items 32 and 33 are preferably Edmund Scientific G32,971, 50 mm diameter 50 mm focal length plano convex coated lenses. Opaque member 35 preferably includes a 0.75 mm diameter aperture to eliminate any unwanted light (i.e., light well outside the central 0.5 mm sphere in the lamp). An infrared absorbing filter 34 may also be used to minimize the thermal buildup in other parts of the system and remove an unwanted infrared portion of the spectrum.

A color wheel 40 is preferably interposed in the optical path of primary light beam 22, preferably between the lamp and the first opaque member, and is driven by a hysteresis synchronous motor 42. As this color wheel rotates at high speed (e.g., about 6,000 rpm) the light entering the first aperture is filtered to be red, green, or blue. A shutter 44, driven by a stepping motor 46, may be used to rapidly turn all light on or off. Shutter 44 is preferably an opaque vane with a 3 mm hole which may align or not align with the first aperture, depending on the position of stepping motor 46. The shutter is useful when data is lacking to start a new print, or when data becomes lacking during the imaging of a print.

Primary light beam 22, after passing through opaque member 35 and shutter 44, is preferably focused by a second lens assembly (including lens 36, preferably an Edmund Scientific G45,082: 9 mm diameter, 9 mm focal length) onto the surface at the first end 51 of fiber optic array 50. The shape of the beam is restricted by a second aperture formed in a second opaque member 37. This aperture is preferably in the shape of a vertically-oriented slit, restricting the width but not the height of the beam which is imaged on the face of fiber optic array 50. The position of the beam on fiber optic array 50 is controlled by a motor and polygon mirror assembly 45. Motor and polygon mirror assemblies are available from a number of sources, including Lincoln Laser Co. of Phoenix, Ariz.

Lens 36 is preferably selected and positioned such that the image of the 0.5 mm sphere generated by lamp 31 is enlarged about 5×. As restricted by the preferred second aperture, the image of the primary light beam at end 51 of fiber optic array 50 (a rectangular face of fibers) is about 0.1" high and about 0.05" wide.

Motor-Polygon mirror assembly 45 spins rapidly about its axis, e.g., preferably at about 11,250 RPM, to successively and sequentially direct primary light beam 22 onto sections in fiber optic array 50. While only 20 lines are shown as fiber optic array 50 in FIG. 3, this should be interpreted as 20 sections (or bundles) arranged into a row, each section (corresponding to one line) being 16 fiber strands wide and 16 fiber strands high. The fiber optic strands are each preferably about 0.0025" in diameter, so each of the 20 sections is about 0.04" wide (scan direction) and about 0.04" tall (cross-scan direction). As a greater number of fibers may be provided in the cross-scan direction in other embodiments, provision is made for more than 16 fibers tall to be illuminated.

It should be appreciated, therefore, that light generator 20 operates as a first modulator for modulating light to the groups or bundles of fiber optic strands 50, thereby jointly modulating the plurality of light beams formed within each fiber optic bundle. Moreover, since the light generator operates to sequentially illuminate each bundle, the light generator may be considered to operate as a multiplexer of sorts for routing light to one of a plurality of bundles. In general, any light producing mechanism that is capable of providing one or more modulated light beams (either sequentially or non-sequentially, singularly or in groups) to a secondary modulation unit (e.g., a light valve cell used in the preferred light valve arrays) may be used consistent with the invention.

Alternative embodiments may use alternative light sources other than a short arc xenon lamp, an alternative number of fiber optic strands per cell, and/or an alternative number of cells. Moreover, the filter wheel may not be used if only black and white imaging is to be performed. Moreover, other means may be used for switching the light from fiber optic bundle to bundle, e.g., a self-resonant galvo mirror, an analog galvo mirror, or shutters, and the light modulation may be sequential or non-sequential (i.e., random access), with multiple or single bundles illuminated at a time. Individual bundles may also be illuminated by separate light sources, e.g., laser diodes or light emitting diodes. Other modifications to the light generator may be made consistent with the invention.

Figure 5:
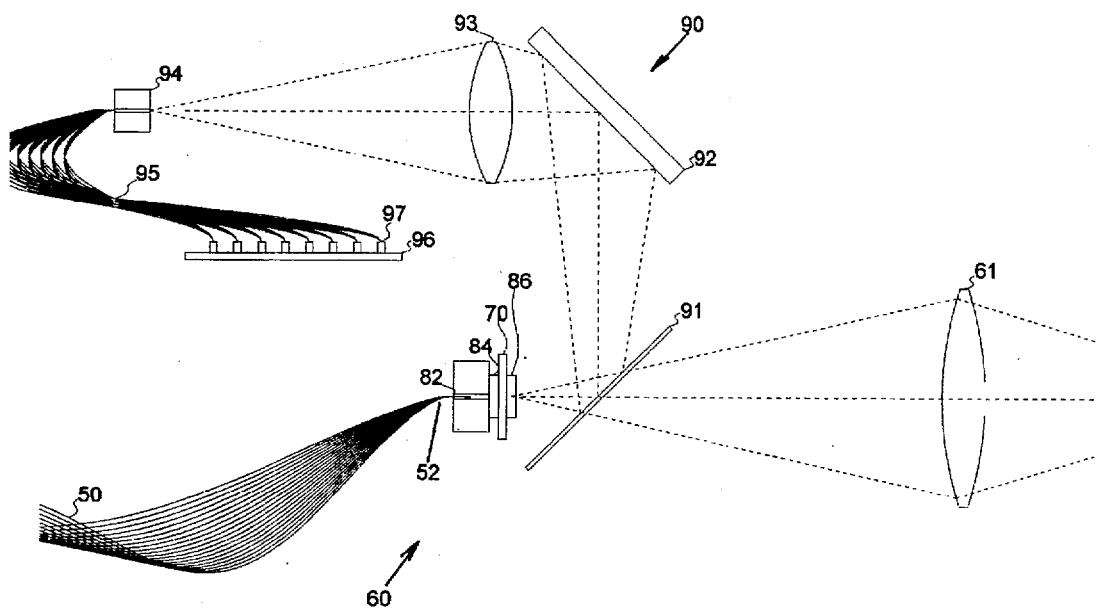
FIG. 5 is a functional top plan view of one of the imaging modules in the imaging apparatus of FIG. 1.

Turning briefly to FIG. 5, illumination module 60 is shown in greater detail to illustrate the connection of the module to light generator 20. Modules 62, 64 and 66 are similarly configured. In particular, a portion of fiber optic array 50 is supported at second end 52 by a fiber optic block 82 to illuminate a light valve array 70 sandwiched between a pair of polarizers 84, 86. The preferred light valve array includes 64 light valve cells arranged in two rows. With this configuration, individual light valve cells within the array are capable of modulating the light conveyed by one of the strands positioned proximate the cells. The modulated light beams output from this arrangement are directed to optical system 61 to be focused on the photosensitive medium as discussed above. With this configuration, light valve array 70 functions as a second modulator for modulating the individual light beams from each bundle of fiber optic strands, resulting in a two-step modulation process when operating in conjunction with light generator 20. A feedback sensor 90 (discussed below) is also interposed between the light valve array and the optical system to regulate the intensities of the individual light valve cells in the array.

Figure 4:
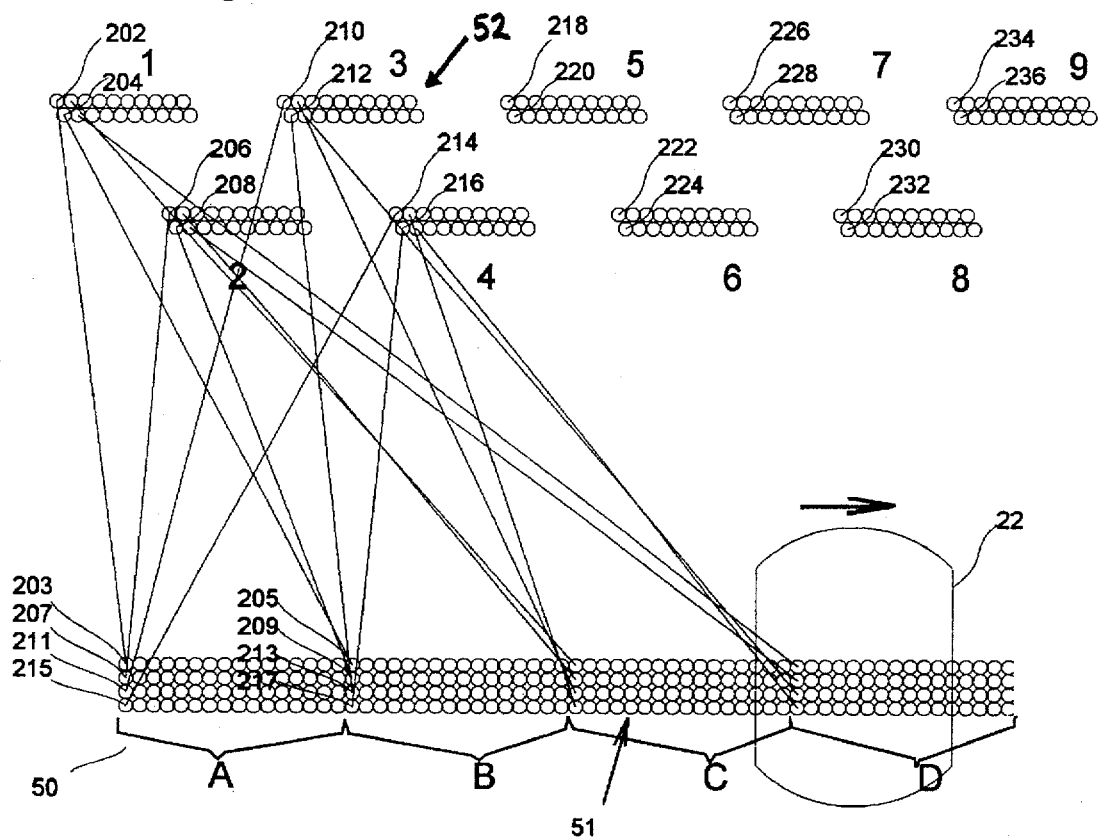
FIG. 4 is a functional representation of a portion of the fiber optic bundles in the imaging apparatus of FIG. 1.

The fiber optic array is preferably configured to route one strand from each bundle to each light valve cell. As an illustration, a functional diagram of the routing of fiber optic strands from light generator 20 to imaging module 60 is shown in FIG. 4. Only four rows of fibers are shown at ends 51, with the other twelve rows in the 16×16 arrangements of fibers within each bundle being omitted for clarity, as they are routed to imaging modules 62, 64 and 66 in a similar manner as will be discussed below.

The array of fiber optic strands is preferably constructed using a programmable winder. The fibers may be wound on a slowly rotating drum over a release liner. A computer controlled leadscrew then controls the place where the fiber is released to lie on the drum, and grooved guides insure that the fibers lie in the correct locations. Two assemblies may be wound back to back, symmetrically. Once an assembly is finished a thin layer of epoxy may be applied to hold the fibers together. Once this is cured the assembly may be cut apart and epoxied together with similar other assemblies. After the epoxy hardens the assemblies may then be cut and polished as necessary.

Returning to FIG. 4, at first end 51, the fiber optic strands are arranged into the row of bundles (numbered A, B, C, D, etc.), while at second end 52 the strands are arranged into groups (numbered 1, 2, 3, 4, 5, 6, 7, 8, 9, etc.), with each group illuminating a separate cell in light valve array 70.

The first ends (the ends illuminated by light generator 20) of a portion of the fibers in bundles A and B are numbered with odd numbers 203 through 217. The other ends (those which illuminate the various cells of the light valve array) are numbered by even numbers one less than that which indicates the illuminated end. The primary light beam 22 moves along this array to illuminate all fibers. Then as the polygon mirror rotates to bring a next facet into illumination, the scanning process is repeated.

The scanning sequence resulting from the sequential illumination of bundles A, B, C, D, etc. is to first illuminate the leftmost fiber of each cell, e.g., 202, 206, 210, 214, 218, 222, 226, 230 and 234 (respectively in groups 1–9). Shortly thereafter the second fiber of each cell (e.g., 204, 208, 212, 216, 220, 224, 228, 232 and 236 for groups 1–9) is illuminated, and so on until all 20 fibers for each cell have been illuminated.

Figure 6A:
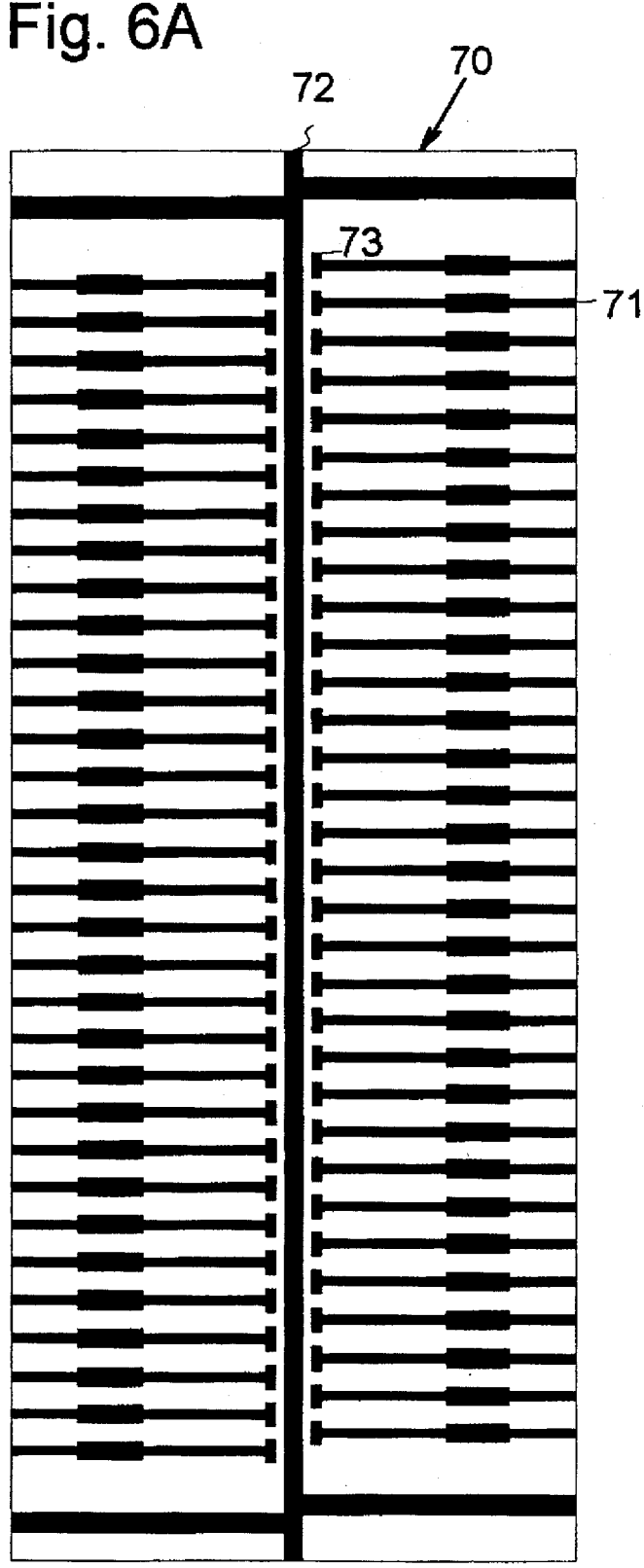
FIG. 6A is a plan view of the light valve array in the imaging module of FIG. 5.
Figure 6B:
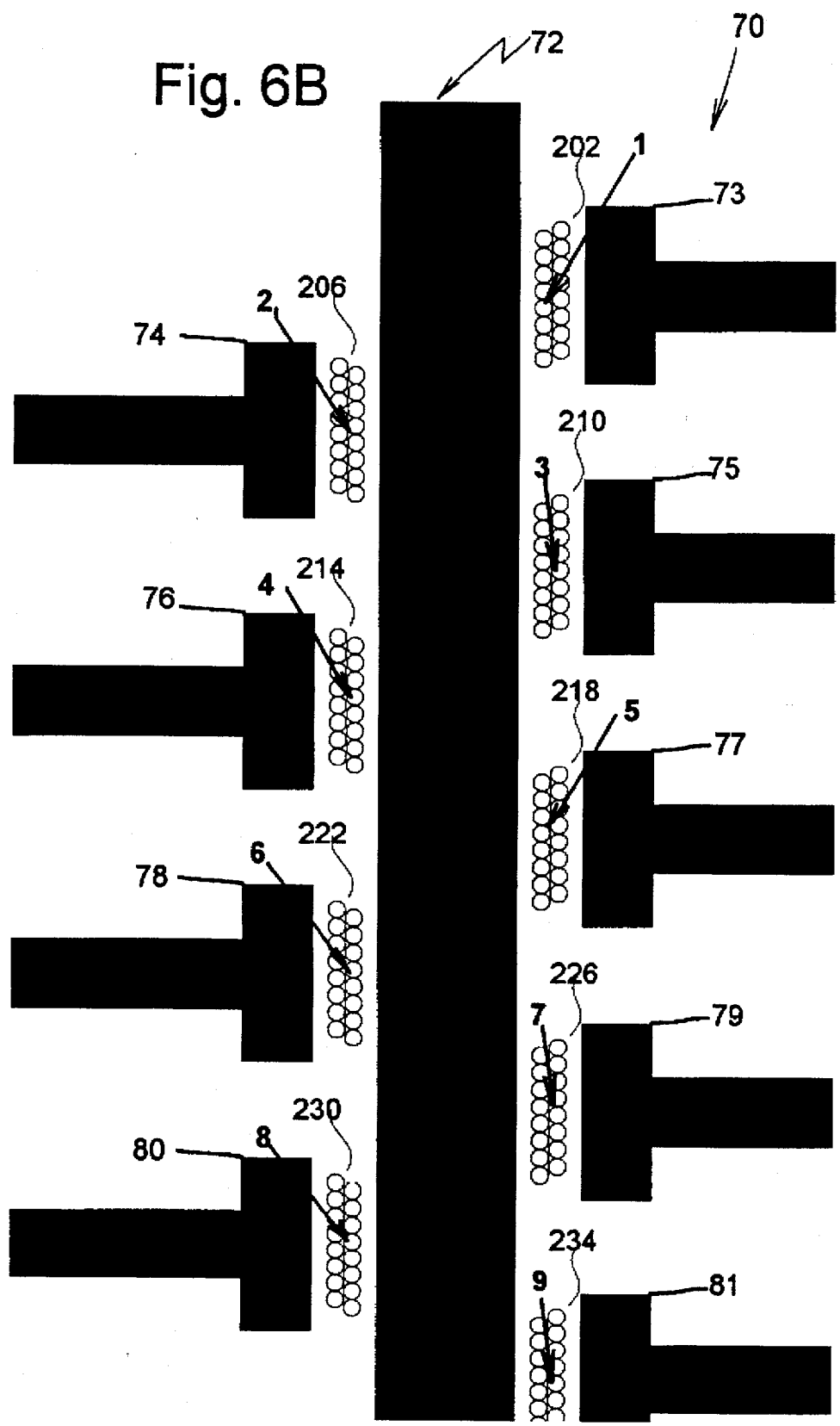
FIG. 6B is an enlarged plan view of a portion of the light valve array of FIG. 6A, also showing the relative positions of the fiber optic strands relative to the cells in the light valve array.

Light valve array 70 is shown in greater detail in FIGS. 6A and 6B. As shown in FIG. 6A, light valve array 70 is preferably a chip approximately 0.6"×1.5" in size of PLZT material, such as Motorola Ceramic Products type 9065 material. This material is preferably about 0.025" thick and is placed between two sheets of polarizing filters (numbered 84 and 86 in FIG. 5). The electrodes are thin layers of nichrome and gold, vapor coated and etched to form the illustrated pattern. The first polarizing filter (numbered 84 in FIG. 5) has an axis −45° relative to the axis of the array, and the second polarizing filter (numbered 86 in FIG. 5) is +45° relative to the axis, such that the two polarizing filters are crossed and thus normally blocking nearly all light. When a voltage is applied between a common electrode 72 and any cell electrode, e.g., electrode 73, the piezoelectric nature of the PLZT material causes stress to occur within the material. Inasmuch as the material is also birefringent, the vector of polarized light rotates. Over the range of zero volts to approximately 450 volts (the halfwave voltage for this configuration), the light transmitted for a given cell varies from that of two polarizers crossed (less than 0.1% of the incident light) to that of two parallel polarizers (about 27%). Electrical connections to the chip are made near its edge 71. Wide areas in the electrode traces allow more easy connection to a printed circuit board, by zebra strips, wire bonding, or heat seal tape (a 3M product), among others.

An enlarged view of a portion of light valve array 70 is shown in FIG. 6B, with groups 1–9 of fiber optic array 50 shown in positions suitable for illuminating the individual light valve cells (i.e., they are positioned at the inputs of the light valve cells). Fiber ends 202, 206, 210, 214, 218, 222, 226, 230 and 234 for groups 1–9 which also appear in FIG. 2 can be seen as being the first fiber in each of the first nine cells. Electrode ends 73–81, together with common electrode 72, form the individual light valve cells. The fibers illuminate the active region of each cell, this being generally the regions between the electrodes 73–81 and common electrode 72.

As shown in FIG. 6A, the light valve array includes two rows of 32 cells each, with the even numbered cells (those in the second row) staggered to be oriented half-way along the scanning or imaging axis between the separation between adjacent odd numbered cells (those in the first row). Moreover, the strands within the groups that illuminate each light valve cell are arranged into two rows of 10 strands each, with those in the second row staggered half-way between those in the first row.

The 1024 pixels of image (64 cells×16 fibers/cell—as four of the fibers in each cell are overlapping) created by each imaging module are in four lines which extend along an imaging axis (i.e., generally oriented along the longitudinal axis of the drum, and similarly along the direction of the common electrode in the light valve array) and which are spaced apart vertically (perpendicular to the longitudinal axis of the drum, and to the direction of the common electrode in the light valve array). The purpose of having two rows of fibers per cell is to eliminate gaps between pixels and maximize the usefulness of each light valve cell. The purpose of having cells on both sides of the array common electrode 72 is to eliminate short circuiting between cells. Cells cannot be made to join each other. The vertical separations caused by having two rows of fibers per cell and having cells on both sides of the array common is compensated for in the data delivery to form a contiguous scan line, so the image on the media does not show any indication of the image having been made in any discontinuous manner. In fact, the slight delay in time (if any) between cells on opposite sides of the array common electrode after data delivery compensation is below the time interval required for reciprocity failure.

Further, as discussed above, in the preferred imaging apparatus 10, 1024 pixels are imaged by each imaging module. Thus, to create a 12" wide image at 300 dpi, 3600 pixels are required, and consequently four imaging modules 60, 62, 64, 66 are preferably used side by side. With four modules, 4096 pixels are created, and the resolution depends on the size of image created by each module which, in turn, depends on the specifications and placement of lenses 61, 63, 65 and 67. Preferably each of the four imaging modules images a 3" wide line (portions 68a, 68b, 68c and 68d), so the resolution at the media is 341 ppi (pixels per inch).

Returning to FIG. 5, feedback sensor 90 is interposed between light valve array 70 and optical system 61 for imaging module 60. It should be appreciated that similar feedback sensors may be incorporated into the other imaging modules, or that a single feedback sensor may control all imaging modules.

A beamsplitter 91 deflects part of the output light beams generated by imaging module 60 towards a mirror 92, through lens 93, and onto a second fiber optic array 95 which has face 94. The other end of these fibers is delivered to each of 64 photodiodes e.g., photodiode 97, which are mounted on a printed circuit board 96.

While the output of each cell is primarily a function of the voltage applied to each cell electrode (e.g., electrode 73), this output will also depend on the intensity of lamp 31, the quality of the polish on the ends of each fiber within array 50, the amount of space charge accumulated by each cell if any, and the temperature of the PLZT material, among other factors. To eliminate such uncertainty in the light output, the light from each of the 64 cells is sampled at face 94 and delivered to the photodiodes on board 96. These photodiodes are in a feedback circuit which regulates the voltage to each cell to obtain the desired light output.

Figure 7:
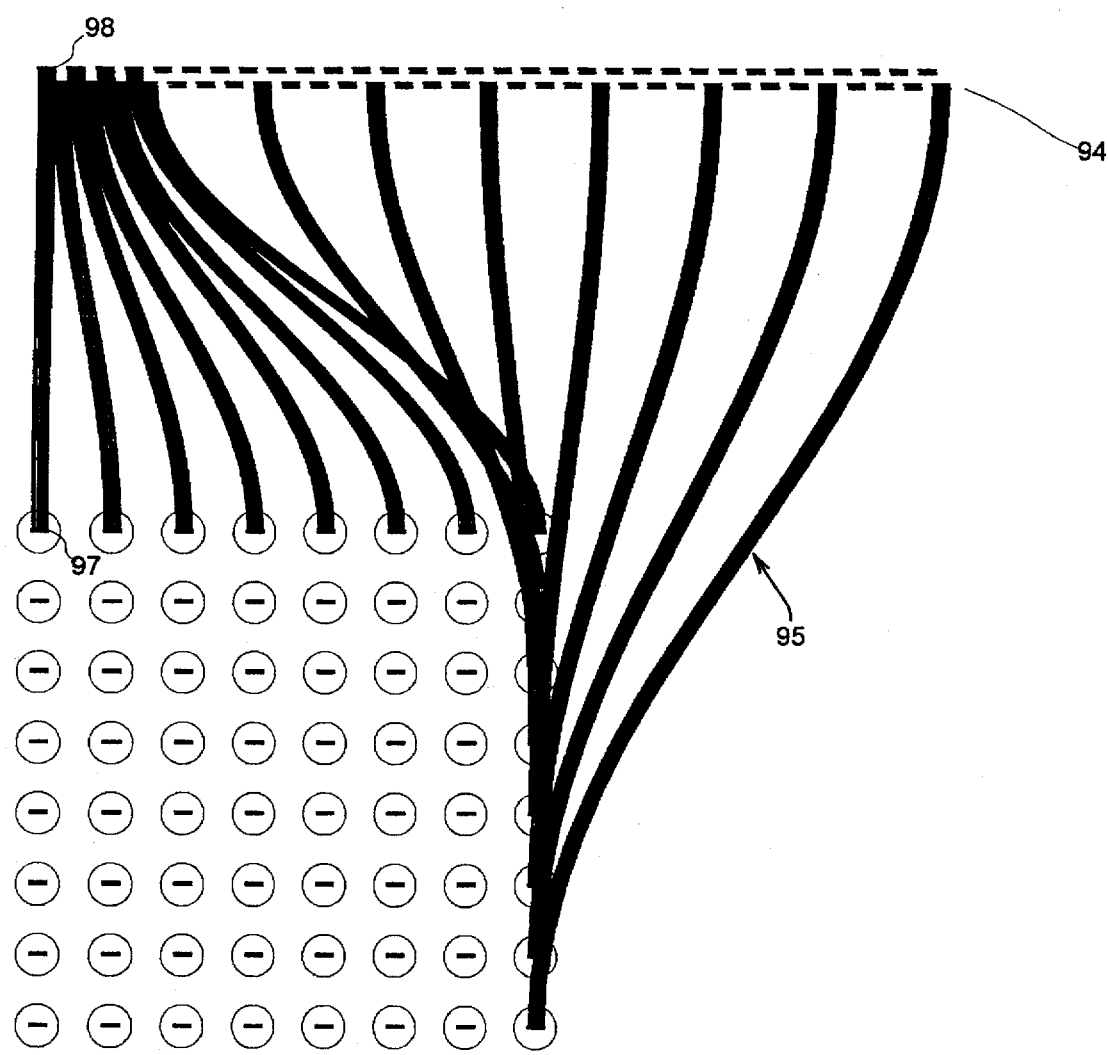
FIG. 7 is a functional representation of a second fiber optic array used in the feedback sensor in the imaging module of FIG. 5.

Second fiber optic array 95 is illustrated in greater detail in FIG. 7. The origin of light is from the first ends of fibers such as fiber 98, being arranged patternwise the same as light valve array 50. The destination of light in each fiber is a point on a printed circuit board containing a corresponding photodiode, such as photodiode 97. If the photodiodes were small enough to be arranged patternwise the same as the light valve array this fiber optic cable would not be necessary. However, since that is generally not the case some way to convey light to these photodiodes is required, and this fiber optic cable arrangement accomplishes that. For the sake of clarity, only some of the fiber optic connections from end to end are illustrated, even though the actual part would have all such connections made.

Returning to FIG. 1, controller 11 coordinates the activities of light generator 20 and imaging modules 60, 62, 64 and 66 to image scan lines on the photosensitive medium. Further, this controller also coordinates the activation of the medium transport so that multiple scan lines may be imaged across the medium to form an image thereupon.

Figure 8:
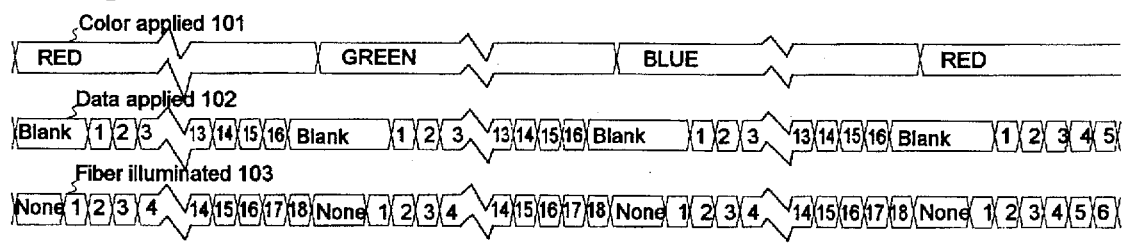
FIG. 8 shows several timing diagrams illustrating a preferred sequence of imaging for the imaging apparatus of FIG. 1.

The sequence of imaging a scan line with imaging apparatus 10 is illustrated by timing diagrams 101, 102 and 103 in FIG. 8. For purposes of simplicity it is assumed in this figure that there is just one sweep of the polygon mirror for red, one for green, and one for blue. Then this process is repeated. However, color negative paper is generally much less sensitive to red than it is to green, and less sensitive to green than it is to blue light. Thus, to maximize the use of the available dynamic range of light within each color, two modifications should be made. First, three sweeps of red should be made for every single sweep of green and blue, and second, the neutral density of the blue layer in the color wheel should be made to be less than that of the other two colors.

Except for the fact that the duplication of red sweeps is not indicated in FIG. 8, however, timing diagram 101 does illustrate which color is being projected onto the face of the fiber optic array 50 during imaging. Timing diagram 103 shows which of the 20 fibers in each light valve cell (e.g., fiber 202 or 204 for cell #1) is primarily illuminated. It is understood that there is some overlap, i.e., for a time both fibers #n and #n+1 will be illuminated. This will result in some blurring between adjacent scan lines. However, this is normal, expected, and desired for imagers. Such blurring minimizes the visibility of scan lines in the resultant image.

Timing diagram 102 shows which data is applied to the light valve cells, i.e., for which of the 20 fibers. The data applied while fibers #1, #2, #19 and #20 are illuminated is "Blank", i.e., the cells are turned off. The purpose for these end cells can be more easily understood by considering the case of not having any end fibers, but rather only the sixteen internal fibers, numbered #3 through #18. When data is first applied to fiber #3 in actuality the scanning beam is only partially illuminating this fiber. Fiber #3 being only dimly illuminated at this instant of time, the photodiode (e.g., 97) senses a reduced light intensity and raises the voltage to that cell to compensate. This is undesirable, in that fiber #3 behaves differently from fiber #4. As data is first applied to fiber #4, fiber #3 is also partially illuminated. The sum of illumination amounts for fibers #3 and #4 together at that instant is approximately the same as it is a short time later when only fiber #4 is illuminated. The feedback photodiode properly adjusts the voltage to the cell over this time. Moreover, as the light leaves fiber #4 and moves to fiber #5 the same is true, namely that the photodiode senses the true cell activity, even though it may receive this information via more than one fiber. Now, going back to fiber #3, as soon as non-blank data is enabled for this cell it is desired that the photodiode respond at that instant in a way similar to the way it will respond when the scanning beam is centered on fiber #3. This is accomplished by having the adjoining fiber #2 also illuminated. Similarly, at the end of the sweep fiber #19 is illuminated so as to again not confuse the photodiode. If no photodiodes were used for feedback, fibers #1, #2, #19 and #20 would not be needed and would not be required.

While only 18 fibers are required to accomplish greater stability of the feedback, the additional two fibers at the ends make the fiber assembly easier inasmuch as adjoining rows of fibers are symmetrical.

It is characteristic of polygon mirrors that there is a region of time when two mirror facets are illuminated, and the scanning beam is split in two directions. Normally this is an undesirable situation. However, in the case of this preferred embodiment the position of fiber optic bundle 50 is adjusted relative to the polygon mirror 45 so as to avoid split beam scanning only for the central 16 fibers. If the scanning beam is partially but minimally split when the end fibers are illuminated this is not of great consequence.

Returning again to FIG. 1, in a fashion well known to those skilled in the art, data is received by controller 11 from a host computer and buffered in a band buffer. At the same time data elsewhere within this band buffer is separated into red, green, and blue components, offset to compensate for spatial differences between even and odd numbered fibers and even and odd numbered cells, selected according to the current color and fiber being imaged, and conveyed to digital to analog converters which in turn drive high voltage drivers for each cell in each imaging module. Also in the data flow, just prior to the high voltage drivers, is a lookup table which compensates for variations between driver circuits and sensing photodiodes.

With this preferred embodiment the following numerical information is relevant:

The speed of the polygon mirror is preferably about 11,250 rpm. With its 8 facets, it therefore scans at about 1,500 scan lines/second.

The color wheel preferably has three sections, each section including 3 wedges of red and one each of green and blue. Edge wedge occupies 1/15 of a circle or 24 degrees. The color wheel turns at about 6,000 rpm, and with its 15 wedges per circle it thus moves through 1,500 wedges per second, thus changing colors at times which match the starts of new sweeps by the polygon mirror. The sequence of colors for a given scan line of data is preferably red, green, blue, red, red. By imaging the green and blue data approximately midway between red images the displacement between images for each of the three colors is minimized. If this were not the case some means for displacing the data slightly would most likely need to be employed. The rotation of the filter wheel is preferably linked and synchronized to the rotation of the polygon mirror, thus assuring proper timing of the transitions in colors.

Moreover, given that 5 color wedges are preferably utilized per scan line of data, the imaging speed is 1500/5 =300 scan lines per second.

Under these imaging conditions, the dwell time on a single fiber is about 1/12 of 1/1500 second, or about 55 microseconds. This is adequate time for data to be sent to each of the 64 cells, and this is reasonable for operation with photodiode feedback. Typically photodiode-op amp combinations have a response time of 4–8 microseconds, and this is well below the 55 microsecond pixel time. The light valves can respond in well under a microsecond, and are thus not a problem. Their speed is determined almost entirely by the speed of their respective high voltage driver.

As discussed above, in the preferred imaging apparatus there is one light generator and multiple imaging modules. Duplications of fiber optic array 50 within the light generator are stacked one on top of another so that all are scanned simultaneously. Recall that this fiber optic array is 4 fibers high for each imaging module. If there are four imaging modules, as there are in this preferred embodiment, then face 51 is 16 fibers high. Given that the beam size is or can be made taller, eight, or any other number of imaging modules can be easily accommodated.

The pixelwise separation between the two adjacent rows of fibers within each cell, and between the even and odd numbered cells, is preferably compensated for by varying the placement of data into a buffer memory. Referring again to FIG. 6B, the various rows of fiber optics may be envisioned at an instant of time coincident with pixel rows #1, #2, #8 and #9. At a later instant in time these same fibers are coincident with pixel rows #2, #3, #9 and #10, etc. Whether the total spatial separation is 8 pixels or a greater or fewer number of pixels depends on the relative speed of the medium relative to the scan line.

Data received from a host computer is preferably buffered within memory circuits associated with each module, wherein in one section data is being written while in another section data is being read for imaging. Data is placed in this memory, e.g., 0, 1, 7 or 8 pixel rows advanced of a nominal pixel position. Thus when the data is later retrieved a correction has been made for these spatial differences. The timewise delay in imaging of various pixels is still short enough (a few milliseconds) such that reciprocity failure does not occur.

Various modifications may be made to the preferred embodiments without departing from the spirit and scope of the invention. For example, as a second preferred embodiment, the number of imaging modules may be changed from four to eight, and the width imaged by each imaging module may be increased to about 6.875". With this configuration, a 50" wide roll of media may be imaged at about 148.9 dpi. The imaging speed may remain at about 300 scan lines/second, thereby producing a lineal imaging speed of about two inches per second. This would permit a 50"×100" point of sale advertisement to be imaged in less than one minute. For highly insensitive media, e.g., display film, the lineal speed may also be reduced and the data flow rate adjusted to compensate. In other words, the vertical and horizontal resolutions may be made to be different from each other.

Black and white Thermal Dry Silver media (such as is available from 3M Co.) may also be imaged at high resolution with a third preferred embodiment of the invention. In this embodiment, no color wheel would be required. Each facet of the polygon mirror would image a separate line of image, so the imaging speed would become about 1,500 scan lines/second. The size of the fiber optic strands may be reduced from 0.0025" to 0.00125", and the number of cells per PLZT chip, may be decreased from 64 to 32, so the number of fiber optic strands per cell is increased from 20 to 80, of which 64 are non-overlapping. Each imaging module would then project 2048 pixels. Thirty-two modules may be used to obtain a total pixel count of 65,536. To provide a resolution of 2,048 pixels per inch, the maximum medium width would be 32". Binary data (each pixel being either black or white) may be rasterized at 9,600 dpi and processed in groups of 4×4 pixels. The number of black pixels within this grid may be counted and used to establish one of 17 grayshades, a means of resolution enhancement commonly practiced within this art. The medium may be advanced at the rate of about 1,500/2048=0.73 inches per second. Consequently, a 32"×40" pre-press film or printing plate may be imaged in 54 seconds.

As a fourth preferred embodiment, the number of cells per imaging module may be made to be sixteen, with thirty two fibers used per module, spaced at an interval 1/15 that of the spacing between cells. The last fiber in one cell may be spatially coincident, in the direction perpendicular to the scan line, with the first fiber in the next cell. No other fibers would be needed or used. With this embodiment, the same data would be used to control the last fiber in one cell as would be used to control the spatially coincident fiber in the next cell.

The change from 64 cells, as used in the first preferred embodiment, to 32 cells has the advantage that fewer drivers would be needed and thus the cost would be reduced. It has the disadvantage, however, that the response time required per fiber would be twice as fast.

The voltages sent to cells may be controlled by a single reference voltage, which is slowly (i.e., over 27 microseconds, the preferred imaging time for each fiber) and linearly switched from zero to a certain reference voltage during the time that the first fiber within a given module is illuminated. The voltage may later be slowly and linearly switched from that reference voltage to zero during the time that the last fiber is illuminated. Thus, pixels imaged by those fibers would be imaged twice, first by a first fiber in one cell and second by a last fiber in another cell. The ramping up and ramping down of the reference voltage may also be made to occur at a rate and timing so as to maintain stability of the feedback circuitry during this time.

This change from the first preferred embodiment has the advantage that the timing required for turn-on and turn-off may be quite slow, and thus the demands on the electronic design may be eased, and/or the circuitry may be made to operate at higher scan rates, such as is required by changing from 16 to 32 active fibers per cell as is done in this embodiment. This change also has the advantage that no fibers other than the active fibers would be required. This embodiment, however, has the disadvantage that additional complexity in the data control circuitry may be required to direct the data for each last fiber for a cell to also be the data for the first fiber in each next cell.

A fifth preferred embodiment may be configured similarly to the third preferred embodiment, except that light source 31 may be implemented using a helium neon laser. A sixth preferred embodiment may also be configured for black and white imaging of graphic arts film, using 64 fibers per cell and 32 cells per module. However, all of the items shown in FIG. 3 in the optical path from lamp 31 through polygon mirror 45 may be eliminated, with each bundle of fibers in array 50 being illuminated instead by a separate individually-modulated light source such as laser diode or light emitting diode. The light sources may be switched so as to sequentially or selectively illuminate associated fibers or groups of fibers. Unlike the disclosed configuration with the polygon mirror, there would be no retrace time when no fibers were fully illuminated. Inasmuch as each light source would be turned on for only a very short time, each light source could operate at a much higher power level than it could if it were operated continuously.

In addition, in any of the above-described preferred embodiments a lower cost, albeit with lower image quality, may be obtained by eliminating the feedback photodiodes (e.g., 97) and their associated components. This may be especially appropriate when an imager is creating halftone dots, where most of the time cells are either fully on or fully off, and there is less need for precise regulation of intensities.

As will be appreciated from the above discussion, numerous other modifications may be made to tailor an imaging apparatus to any particular application.

In summary, in the preferred embodiments each imaging module may accomplish a resolution that would normally take many more light valves using conventional imaging technologies. For example, with the first preferred embodiment discussed above, the resolution which would otherwise be achieved with 1024 light valve cells and 1024 driver circuits is realized using only 64 cells and 64 drivers. This results in substantial savings in the cost of production, as well as increased reliability.

In prior art imagers a polygon mirror is generally thought of as scanning a single beam across the width of the media. In the preferred embodiments, however, a polygon mirror may be considered to sweep hundreds of beams, each across a small distance (0.046" in the first preferred embodiment). In prior art imagers both the polygon mirror and the focusing lens must be a substantial distance from the media, and thus any wobble in its bearings or vibration of the system can cause displacement of the scan lines. In the preferred embodiments, however, the behavior of the polygon mirror is not critical. Moreover, the focusing lens is a short distance from the media, thus achieving high resolution at low cost.

Many other configurations will be apparent to those skilled in the art. For example, the imaging modules may be movable in a cross-scan direction to provide band-wise imaging. Moreover, the scanning and cross-scanning directions may be reversed with respect to the photosensitive medium. In fact, practically any method of scanning an image on a photosensitive medium may be modified to incorporated the benefits of preferred embodiments of the invention. As other modifications will be appreciated by one skilled in the art, the invention therefore lies in the claims hereinafter appended.

What is claimed is:

1. An apparatus for imagewise exposing photosensitive media, comprising:
  (a) a light valve array having a plurality of cells;
  (b) a plurality of fiber optic strands having first and second ends and arranged relative to the light valve array to illuminate the light valve array through the second ends, with the second ends of at least two strands illuminating each cell in the light valve array; and
  (c) a light generator selectively illuminating the first ends of the plurality of fiber optic strands.

2. The apparatus of claim 1, wherein each cell in the light valve array outputs a modulated light beam, the apparatus further comprising:
  (a) an optical system, arranged to receive the modulated light beams from the light valve array, the optical system conveying the modulated light beams to a photosensitive medium;
  (b) a medium transport for moving the photosensitive medium relative to the optical system; and
  (c) a controller, coupled to the light valve array and the medium transport, for coordinating movement of the photosensitive medium with modulation of the light beams to expose an image on the photosensitive medium.

3. The apparatus of claim 2, further comprising a drum supporting the photosensitive medium and having a longitudinal axis, wherein the medium transport comprises a motor that rotates the drum about the longitudinal axis.

4. The apparatus of claim 1, wherein the first ends of the plurality of fiber optic strands are arranged into a plurality of bundles, each bundle having at least one strand illuminating each cell in the light valve array, and wherein the light generator sequentially illuminates each bundle of strands.

5. The apparatus of claim 4, wherein the bundles are arranged generally in a row, and wherein the light generator comprises:
  (a) a light source generating a primary light beam; and
  (b) a polygon mirror rotating about an axis generally orthogonal to the row of bundles, wherein the mirror receives the primary light beam and reflects the primary light beam along the row of bundles to selectively illuminate the first ends of the plurality of fiber optic strands.

6. The apparatus of claim 5, wherein the light source comprises:
  (a) a lamp generating the primary light beam;
  (b) a first opaque member including a first aperture;
  (c) a first lens assembly disposed between the lamp and the first opaque member for focusing the primary light beam into the aperture;
  (d) a second lens assembly disposed between the first opaque member and the polygon mirror for focusing the primary light beam onto the first ends of the plurality of fiber optic strands;
  (e) a color wheel disposed between the lamp and the polygon mirror for selectively filtering the primary light beam; and
  (f) a shutter disposed between the lamp and the polygon mirror for selectively blocking transmission of the primary light beam.

7. The apparatus of claim 6, wherein the light source further comprises a second opaque member disposed between the second lens assembly and the polygon mirror, the second opaque member including a second aperture, the second aperture restricted in width to control the width of the primary light beam along the row of bundles.

8. The apparatus of claim 4, wherein the light generator comprises a plurality of individually-modulated light sources, each individually-modulated light source illuminating the first ends of the fiber optic strands in one of the plurality of bundles.

9. The apparatus of claim 4, wherein the cells in the light valve array are arranged into first and second parallel rows extending generally along an imaging axis, and wherein the cells in the first row are offset from the cells in the second row along the imaging axis by about one half the spacing between adjacent cells.

10. The apparatus of claim 9, wherein the second ends of the fiber optic strands illuminating each cell in the light valve array are arranged into first and second rows, and wherein the second ends of the strands in the first row are offset from the second ends of the strands in the second row along the imaging axis by about one half the spacing between adjacent strands.

11. The apparatus of claim 10, wherein the light valve array is one of a plurality of light valve arrays arranged generally along the imaging axis, each including a plurality of cells arranged into first and second parallel rows extending generally along the imaging axis, and wherein each cell in each light valve array is illuminated by a strand from each bundle of fiber optic strands.

12. The apparatus of claim 11, wherein the plurality of light valve arrays output a scan line of light beams oriented along the imaging axis and having a length of at least the width of an imaging area on the photosensitive medium.

13. The apparatus of claim 12, wherein the plurality of light valve arrays include four light valve arrays, each light valve array including 32 cells in each row, and each cell including 10 fiber optic strands in each row, and wherein the plurality of bundles includes 20 bundles, each bundle including a 16×16 array of fiber optic strands; whereby a scan line of 1024 light beams is generated.

14. The apparatus of claim 1, further comprising a feedback sensor for regulating each cell in the light valve array, the feedback sensor including a plurality of photosensors, each photosensor sensing light output from one cell in the light valve array.

15. The apparatus of claim 14, wherein the feedback sensor comprises:
    (a) a beamsplitter for receiving light beams emitted from the cells in the light valve array and splitting each light beam into an imaging light beam and a feedback light beam;
    (b) a second plurality of fiber optic strands having first and second ends, the second end of each fiber optic strand in the second plurality of fiber optic strands illuminating one of the photosensors; and
    (c) an optical system receiving the feedback light beams and conveying the feedback light beams to the first ends of the second plurality of fiber optic strands.

16. The apparatus of claim 1, wherein the light valve array comprises a PLZT integrated circuit.

17. An apparatus for imagewise exposing a photosensitive media, comprising:
    (a) light generating means for generating first, second, third and fourth light beams, the light generating means including a first modulating means for modulating the first, second, third and fourth light beams;
    (b) second modulating means, having first and second inputs, for modulating light received at the first and second inputs; and
    (c) conveying means for conveying the first and third light beams from the first modulating means to the first input of the second modulating means and the second and fourth modulated light beams from the first modulating means to the second input of the second modulating means.

18. The apparatus of claim 17, wherein the conveying means comprises first, second, third and fourth fiber optic strands respectively conveying the first, second, third and fourth light beams, each fiber optic strand having a first end and a second end, and wherein the first ends of the fiber optic strands are arranged into adjacent first and second bundles, the first bundle including the first and second fiber optic strands and the second bundle including the third and fourth fiber optic strands.

19. The apparatus of claim 18, wherein the first modulating means comprises a light source for generating a primary light beam and a rotating polygon mirror for receiving the primary light beam and reflecting the primary light beam to selectively illuminate the first and second bundles of fiber optic strands; whereby the first modulating means jointly modulates the first and second light beams, and jointly modulates the third and fourth light beams.

20. The apparatus of claim 19, wherein the second modulating means comprises a light valve array including first and second cells illuminated respectively through the first and second inputs.

21. An apparatus for imagewise exposing photosensitive media, comprising:
    (a) a drum supporting a photosensitive medium and having a longitudinal axis;
    (b) a motor coupled to rotate the drum about the longitudinal axis;
    (c) a plurality of PLZT light valve arrays, each light valve array having a plurality of cells arranged into first and second parallel rows extending generally along an imaging axis, with the cells in the first row offset from the cells in the second row along the imaging axis by about one half the spacing between adjacent cells, and each cell including an input for receiving light and an output for generating a modulated output beam therefrom;
    (d) an optical system for conveying the modulated output beams from the plurality of PLZT light valve arrays to the photosensitive medium along a scan line extending along the imaging axis for the width of an imaging area on the photosensitive medium;
    (e) a plurality of fiber optic strands having first and second ends, wherein:
        (1) the first ends of the plurality of fiber optic strands are arranged into a plurality of bundles arranged along a row; and
        (2) each bundle of fiber optic strands has at least one fiber optic strand with its second end coupled to the input of each cell in each light valve array;
    (f) a light source for generating a primary light beam;
    (g) a polygon mirror rotating about an axis generally orthogonal to the row of bundles, wherein the mirror receives the primary light beam and reflects the primary light beam along the row of bundles to sequentially illuminate each bundle of fiber optic strands; and
    (h) a feedback sensor for sensing an intensity of the output light beam of each cell in each PLZT light valve array, the feedback sensor including:
        (1) a beamsplitter for receiving the output light beams emitted from the cells in the PLZT light valve arrays and splitting a portion of each output light beam into a feedback light beam; and
        (2) a plurality of photosensors, each photosensor receiving one of the feedback light beams and providing a feedback signal related to the intensity thereof;
    (i) a controller, coupled to the plurality of PLZT light valve arrays, the drum motor and the feedback sensor, for:
        (1) regulating the intensities of the output light beams in response to the feedback signals from the feedback sensor; and
        (2) coordinating the movement of the photosensitive medium with the modulation of the output light beams to expose an image on the photosensitive medium.

22. A method of imagewise exposing photosensitive media, the method comprising the steps of:
    (a) generating a plurality of light beams;
    (b) jointly modulating groups of light beams from the plurality of light beams;
    (c) modulating individual light beams within each group of light beams to generate a plurality of output light beams; and
    (d) conveying the output light beams to a photosensitive medium to expose an image thereon.

23. The method of claim 22, wherein the jointly modulating step includes the step of sequentially modulating the groups of light beams, wherein the individual modulating step is performed with a light valve array, and wherein the jointly modulating step further includes the step of sequentially conveying groups of light beams to the light valve array.

24. The method of claim 23, wherein the sequentially conveying step is performed with a plurality of fiber optic strands having first and second ends, with the first ends arranged into bundles and the second ends directed to one of a plurality of cells in the light valve array, wherein each bundle conveys one of the groups of light beams, and wherein each bundle includes a fiber optic strand outputting to each cell in the light valve array.

* * * * *

UNITED STATES PATENT AND TRADEMARK OFFICE
CERTIFICATE OF CORRECTION

PATENT NO. : 5,684,620
DATED : NOVEMBER 4, 1997
INVENTOR(S) : SCHOON

It is certified that error appears in the above-identified patent and that said Letters Patent is hereby corrected as shown below:

Col. 5, line 16: delete "side--" after the words "arranged in a"

Col. 5, line 41: "8$b$" should read ---68$b$---

Signed and Sealed this

Eighth Day of September, 1998

Attest:

BRUCE LEHMAN

Attesting Officer                                *Commissioner of Patents and Trademarks*